United States Patent
Garg et al.

(10) Patent No.: US 9,092,459 B2
(45) Date of Patent: **\*Jul. 28, 2015**

(54) MEDIA OBJECT QUERY SUBMISSION AND RESPONSE

(71) Applicant: Google Inc., Mountain View, CA (US)

(72) Inventors: Gaurav Garg, San Francisco, CA (US); Abhishek Bapna, Hyderabad (IN)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/062,350

(22) Filed: Oct. 24, 2013

(65) Prior Publication Data

US 2014/0289230 A1 Sep. 25, 2014

Related U.S. Application Data

(63) Continuation of application No. 13/552,587, filed on Jul. 18, 2012, now Pat. No. 8,589,383, which is a continuation of application No. 12/060,000, filed on Mar. 31, 2008, now Pat. No. 8,321,406.

(51) Int. Cl.
*G06F 7/00* (2006.01)
*G06F 17/30* (2006.01)

(52) U.S. Cl.
CPC .... *G06F 17/30277* (2013.01); *G06F 17/30654* (2013.01); *G06F 17/30864* (2013.01)

(58) Field of Classification Search
CPC ......... G06Q 50/01; G06Q 30/02; G09B 7/00; G09B 7/02
USPC ........................................................ 707/717
See application file for complete search history.

(56) References Cited

U.S. PATENT DOCUMENTS

| | | | | |
|---|---|---|---|---|
| 5,384,894 | A  * | 1/1995 | Vassiliadis et al. | 706/52 |
| 6,026,148 | A  * | 2/2000 | Dworkin et al. | 379/88.18 |
| 6,028,601 | A  * | 2/2000 | Machiraju et al. | 715/705 |
| 6,064,978 | A  * | 5/2000 | Gardner et al. | 705/7.32 |
| 6,938,068 | B1 * | 8/2005 | Kraft et al. | 709/203 |
| 7,376,910 | B2 * | 5/2008 | Inui et al. | 715/797 |

(Continued)

FOREIGN PATENT DOCUMENTS

| | | |
|---|---|---|
| EP | 1 653 379 | 5/2006 |
| JP | 2003-216633 | 7/2003 |
| WO | WO 2004/102413 | 11/2004 |

OTHER PUBLICATIONS

International Search Report and Written Opinion from International Application No. PCT/US2009/038994 mailed Nov. 13, 2009, 12 pages.

(Continued)

*Primary Examiner* — Binh V Ho
(74) *Attorney, Agent, or Firm* — Fish & Richardson P.C.

(57) ABSTRACT

Methods and systems for submitting media object queries and receiving suggested answers for the media object queries. In one aspect, a method includes receiving from a first user a first media object and a first query relating to content in the first media object, presenting the first media object and the first query to multiple second users, receiving a suggested answer to the first query from each of two or more second users of the multiple second users, where at least two of the suggested answers are distinct, ranking the suggested answers, and presenting one or more of the ranked suggested answers to the first user.

20 Claims, 5 Drawing Sheets

(56) References Cited

U.S. PATENT DOCUMENTS

| | | | |
|---|---|---|---|
| 7,603,413 B1* | 10/2009 | Herold et al. | 709/204 |
| 2004/0032486 A1* | 2/2004 | Shusman | 348/14.09 |
| 2005/0125391 A1 | 6/2005 | Curtis et al. | |
| 2005/0246328 A1 | 11/2005 | Zhang et al. | |
| 2006/0106788 A1* | 5/2006 | Forrest | 707/4 |
| 2006/0235689 A1* | 10/2006 | Sugihara et al. | 704/257 |
| 2006/0287907 A1 | 12/2006 | Kim | |
| 2007/0073651 A1 | 3/2007 | Imielinski | |
| 2008/0005091 A1 | 1/2008 | Lawler et al. | |
| 2008/0059308 A1* | 3/2008 | Gerken | 705/14 |
| 2008/0077478 A1* | 3/2008 | Kim | 705/10 |
| 2008/0103877 A1 | 5/2008 | Gerken | |
| 2009/0171929 A1* | 7/2009 | Jing et al. | 707/5 |

OTHER PUBLICATIONS

Lowensohn, "PicAnswers helps identify house plans, the rest of life's little mysteries," [online] [retrieved on Jul. 3, 2012]. Retrieved from the Internet <URL: http://news.cnet.com/8301-17939_109-9866897-2.html>, 3 pages.

Yeh et al., "Multimodal question answering for mobile devices," Proceedings of the 13th International Conference on Intelligent User Interfaces, New York, NY, Jan. 1, 2008, pp. 405-408.

Supplementary European Search Report dated Aug. 1, 2012, from European Patent Application No. 09755398.6, 4 pages.

Communication dated Aug. 30, 2012 from European Patent Application No. 09755398.6, 5 pages.

Office Action mailed Apr. 9, 2013 from Japanese Application No. 2011-503104, 3 pages.

Anonymous: PicAnswers.com, "ToothPick or Food skewer," Feb. 2, 2008, XP055088586, Retrieved from the Internet: URL: <http://web.archive.org/web/20080213042941/http://www.picanswers.com/questions/105-toothpick-or-food-skewer> [retrieved on Nov. 15, 2013], 2 pages.

Office Action in European Application No. 09755398.6, dated Nov. 27, 2013, 6 pages.

Canadian Office Action in Canadian Application No. 2,720,012, dated Mar. 6, 2015, 5 pages.

* cited by examiner

MEDIA OBJECT QUERY SUBMISSION AND RESPONSE

CROSS-REFERENCE TO RELATED APPLICATIONS

This application is a continuation application of, and claims priority to, U.S. patent application Ser. No. 13/552,587, for Media Object Query Submission and Response, to Gaurav Garg and Abhishek Bapna, which was filed on Jul. 18, 2012, which is a continuation application of U.S. patent application Ser. No. 12/060,000, for Media Object Query Submission and Response, to Gaurav Garg and Abhishek Bapna, which was filed on Mar. 31, 2008. The disclosure of the foregoing applications are incorporated here by reference.

BACKGROUND

This specification relates to submitting media object queries and receiving suggested answers for the media object queries.

Generally, internet searching is based on text queries. Internet search engines aim to identify resources (e.g., web pages, images, text documents, processes, multimedia content) that are relevant to a user's needs and to present information about the resources in a manner that is useful to the user. In response to a text query submitted by a user, search engines return search results referring to resources identified as satisfying or matching the text query. Occasionally, people observe something new around them and are curious to learn more about the new thing. However, if a person cannot identify or describe a particular object, the person can find it difficult to formulate a meaningful text query about the object.

SUMMARY

This specification describes technologies relating to submitting media object queries and receiving suggested answers for the media object queries.

In general, one aspect of the subject matter described in this specification can be embodied in methods that include the actions of receiving from a first user a first media object and a first query relating to content in the first media object, presenting the first media object and the first query to multiple second users, receiving a suggested answer to the first query from each of two or more second users of the multiple second users, where at least two of the suggested answers are distinct, ranking the suggested answers, and presenting one or more of the ranked suggested answers to the first user. Embodiments of the aspect can include systems, apparatuses, and computer program products.

Implementations of the aspect can optionally include one or more of the following features. A suggested answer from a particular second user can be either a new suggested answer submitted by the particular second user in response to the first query or a previous suggested answer to the first query selected by the particular second user, where the previous suggested answer is a suggested answer previously submitted by a different second user of the multiple second users in response to the first query. Ranking the suggested answers can further include grouping similar suggested answers, for each group of similar suggested answers, determining a rank score for the group by counting the instances that a suggested answer in the group was submitted or selected by a second user, for each distinct suggested answer, determining a rank score for the distinct suggested answer by counting the instances that the distinct suggested answer was submitted or selected by a second user, and ranking the distinct suggested answers and groups of similar suggested answers based on the determined rank scores.

A suggested answer from a particular second user can be either a new suggested answer submitted by the particular second user in response to the first query or a suggested answer selected by the particular second user from multiple suggested answers derived from previous suggested answers previously submitted by different second users of the multiple second users in response to the first query. Presenting the first media object and the first query to the multiple second users can further include including the first media object and query pair in a list of second media object and query pairs, the first media object and query pair having a position in the list, and selecting the first media object and query pair from the list for presentation to the multiple second users, where the selection is based on the position of the first media object and query pair in the list.

An indication of interest in the first media object and query pair from each of one or more second users of the multiple second users can be received. The position of the first media object and query pair in the list can be modified based on the indications of interest in the first media object and query pair from the one or more second users of the multiple second users, and the first media object and query pair can be selected from the list for presentation to one or more third users, where the selection is based on the modified position of the first media object and query pair in the list. Modifying the position of the first media object and query pair in the list can also be based on the number of suggested answers submitted or selected by second users of the multiple second users.

Data can be presented to the first user, where the data relates to one or more media object and query pairs received from the first user or one or more suggested answers submitted or selected by the first user in response to media object and query pairs received from second users. The suggested answers to the first query can be received over a specified time period. The media object can be one of an image file, a video file, or an audio file.

In general, in one aspect, a system is provided. The system includes a user interface device, and one or more computers operable to interact with the user interface device and to: receive from a first user of the user interface device a first media object and a first query relating to content in the first media object, present the first media object and the first query to multiple second users, receive a suggested answer to the first query from each of two or more second users of the multiple second users, where at least two of the suggested answers are distinct, rank the suggested answers, and present one or more of the ranked suggested answers to the first user on the user interface device.

Implementations of the aspect can optionally include one or more of the following features. The one or more computers can include a server operable to interact with the user interface device through a data communication network, and the user interface device can be operable to interact with the server as a client. The user interface device can include a networking interface. The one or more computers can include one personal computer, and the personal computer can include the user interface device.

Particular embodiments of the subject matter described in this specification can be implemented to realize one or more of the following advantages. A community-based platform that allows media object query submission and response benefits from the fact that the ability to identify key features in a media object (e.g., an image or a video) is greater in humans than in currently available machine algorithms. Aggregating knowledge across multiple users can help answer questions about the contents of a media object that would be hard for machines to answer. The community-based platform also benefits from the fact that users are willing to contribute their time and effort to answer queries for multiple reasons, e.g., for entertainment, for peer recognition, or because of altruistic tendencies.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
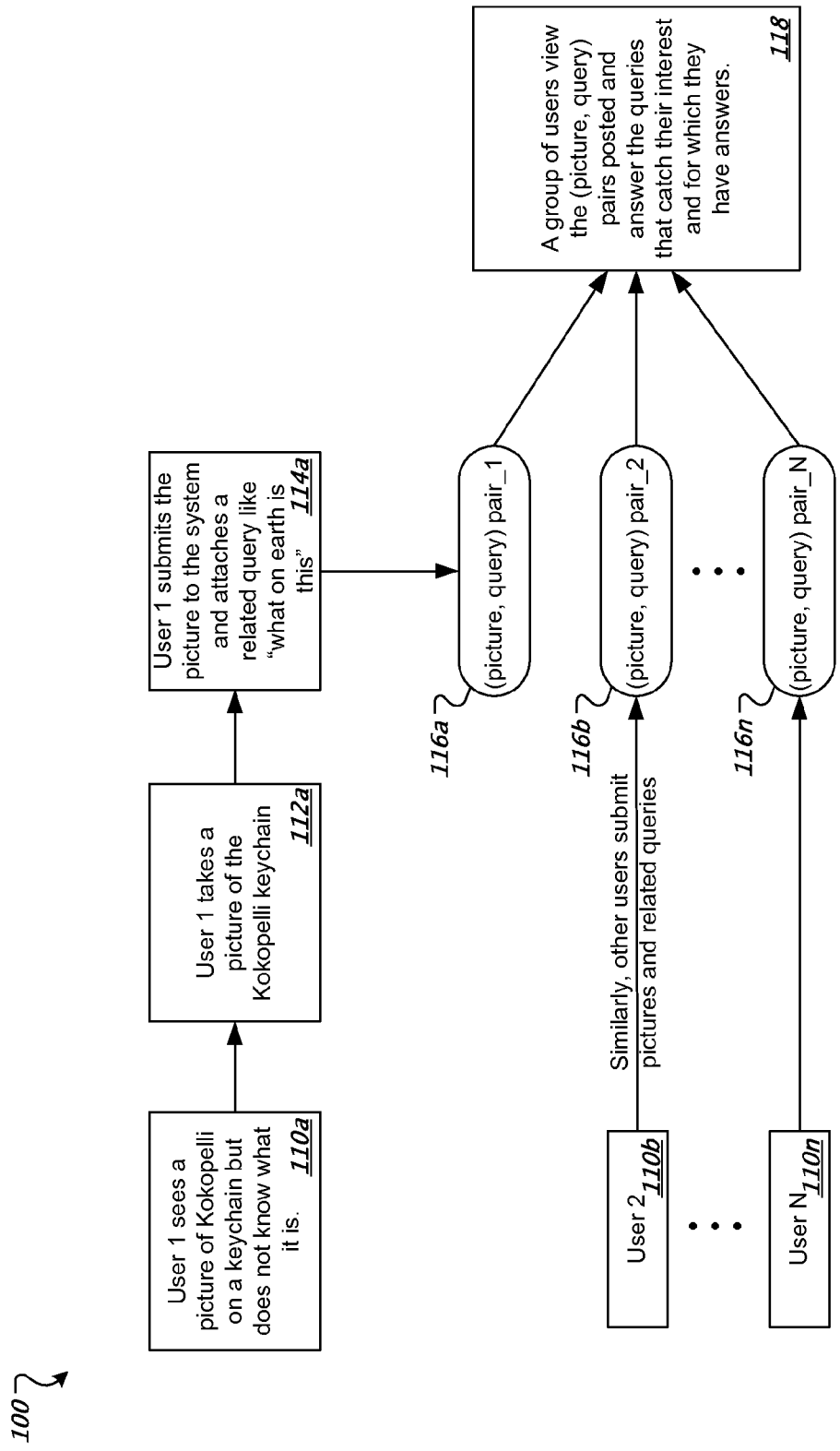
FIG. 1 illustrates an example process for submitting picture and query pairs and receiving suggested answers for the picture and query pairs.

FIG. 1 illustrates an example process 100 for submitting picture and query pairs and receiving suggested answers for the picture and query pairs. For convenience, the example process 100 will be described with reference to a system (e.g., a community-based platform) that performs the process 100. Generally, the process 100 receives a picture and related query from a user, collects answers provided by other users, and presents the answers to the submitting user. Although the media objects submitted are pictures (e.g., image files) in the example process 100, other types of media objects (e.g., video files or audio files) can similarly be submitted by users.

FIG. 1 illustrates a scenario where a user wishes to learn what a picture of Kokopelli represents. In the example process 100, User 1 sees a picture of Kokopelli on a keychain but does not know what it is (110a). User 1 takes a picture of the Kokopelli keychain, for example, using a camera application on the user's mobile phone (112a).

User 1 submits the picture of the Kokopelli keychain to a system (e.g., a community-based platform) and attaches or includes a related text query like "what on earth is this" (114a). The system can store the picture of the Kokopelli keychain and the related text query as the (picture, query) pair_1 (116a). Similarly, User 2, . . . , User N see objects (e.g., people, places, or things) about which they have questions (110b, . . . , 110n) and submit pictures of the objects with related text queries to the system, which stores corresponding (picture, query) pair_2, . . . , (picture, query) pair_N (116b, . . . , 116n).

A group of users, which can include one or more of User 1, . . . , User N, view the (picture, query) pairs posted on the system and answer the queries that catch their interest and for which they have answers (118). For each (picture, query) pair, the system collects the respective answers provided by the contributing users and presents the collected answers to the respective user that submitted the (picture, query) pair. In some implementations, an answer is ranked based on how many contributing users believe that answer to be the correct answer. In some implementations, the system also captures a general level of interest in the (picture, query) pair to the community. The system can use the level of interest to determine whether or not to continue showing the (picture, query) pair to additional users of the system. The system can encourage users to submit queries and to provide answers through a reputation mechanism that provides peer recognition, as described below.

In some implementations, a user submits a (picture, query) pair through a web interface (e.g., a web browser running on a personal computer) or a mobile interface (e.g., a wireless application protocol (WAP) browser running on a mobile phone). A web interface for a system performing the process 100 can include an authentication mechanism to allow the user to log into the system. For example, if the system is a community-based platform, a community member can be required to log into the community platform using a user login name and password. In some implementations, the web interface can include the example interfaces 200-400 of FIGS. 2-4, which are described in detail below.

A mobile interface for a system performing the process 100 can allow a user to capture a picture of the unknown object and submit the picture with a text query, e.g., as a Short Message Service (SMS) message or a Multimedia Messaging Service (MMS) message. In some implementations, the phone number of the user's mobile phone is associated with a web interface login name of the user. A user submitting a picture and query pair on a mobile interface can later view the submitted pair and provided answers by logging into a web interface for the system.

Figure 2:
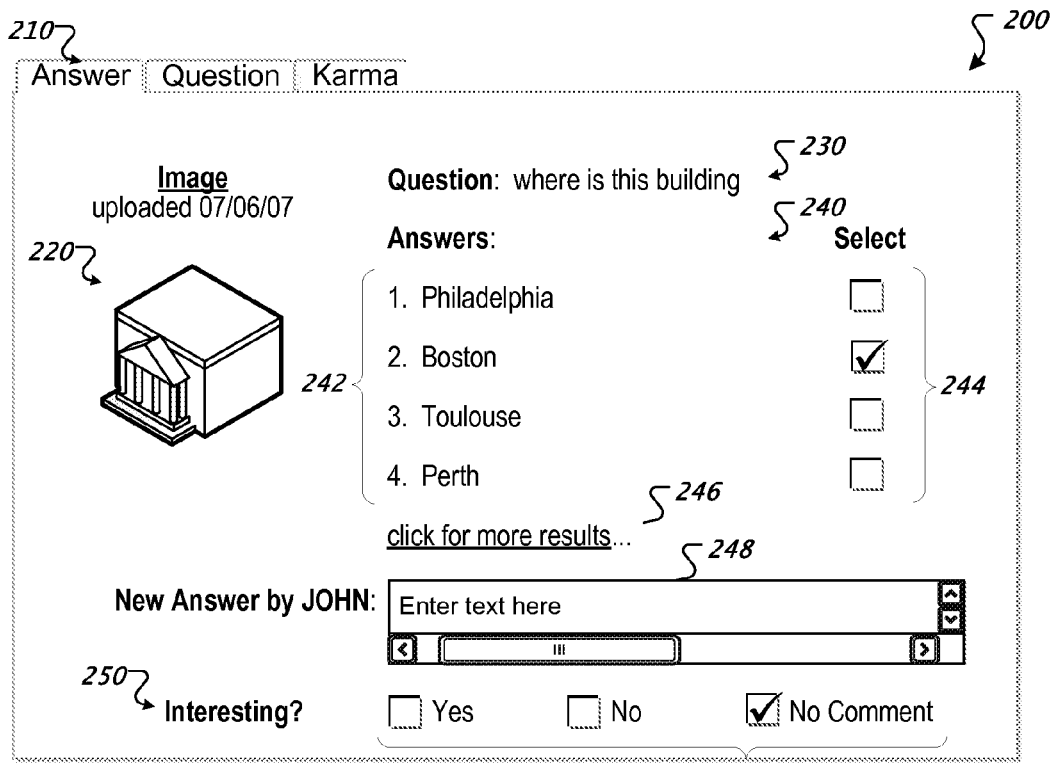
FIG. 2 illustrates an example interface for providing suggested answers for media object and query pairs.

FIG. 2 illustrates an example interface 200 for providing suggested answers for media object and query pairs. The example interface 200 is illustrated as an answer tab 210 of a web interface, e.g., a web interface of a system that performs the example process 100 of FIG. 1. In some implementations, the web interface can include a question tab (e.g., question tab 310 of FIG. 3) and a karma tab (e.g., karma tab 410 of FIG. 4).

The example interface 200 includes a media object 220, a query 230, an answer area 240, and a level of interest area 250. The media object can be, for example, an image or a video. In some implementations, the example interface 200 can include information about the media object, e.g., a date the media object was uploaded to the system, a location where the data of the media object was captured, or the name of the user who submitted the media object. For example, if the media object is generated from data captured from a mobile phone enabled for the Global Positioning System (GPS), the GPS coordinates of the mobile phone at the time the media data was captured can be embedded as metadata in the media object. The example interface 200 can include the GPS coordinates as additional information about the media object. The example interface 200 can also or alternatively include a hyperlink to a map application, where user selection of the hyperlink triggers the system to present (e.g., in an overlay or a separate interface) a map of the location of the GPS coordinates.

In some implementations, an overall quality measure (e.g., a "guru" label) is presented next to the submitting user's name on the example interface 200, indicating the quality of media objects submitted and answers provided by the submitting user. The query 230 is related to content in the media object 220. The query 230 can be directed to a particular thing in the media object 220. For example, if the media object 220 is a video clip of views from San Francisco, the query 230 can ask what the name of the red bridge is. In the example of FIG. 2, a user has submitted an image of a building with a query about where the building is located. In some implementations, the system selects a particular media object 220 and related query 230 pair for impressing upon a user (i.e., presentation to the user) according to an impression share mechanism, described in more detail below.

The answer area 240 includes suggested answers 242, selection elements 244 (e.g., checkboxes or buttons), a hyperlink for more results 246, and a text box 248. A user who receives an impression of the media object 220 and query 230 pair can respond to the pair by selecting a suggested answer 242 using an associated selection element 244. The user can view additional suggested answers by selecting the hyperlink for more results 246. Alternatively, the user can respond by submitting a new answer, e.g., by inputting the new answer in the text box 248. In some implementations, the contents of the text box 248 are labeled as the new answer provided by the particular user.

In some implementations, the suggested answers 242 are answers previously submitted by different users in response to viewing the media object 220 and query 230 pair. In other implementations, the suggested answers 242 are answers derived from previously suggested answers submitted by different users in response to viewing the media object 220 and query 230 pair.

In some implementations, the answer area 240 displays the suggested answers 242 in order according to how many contributing users select each particular suggested answer 242. In other implementations, the answer area 240 displays the suggested answers 242 in random order to prevent the order from biasing user selection. For example, a user viewing the media object 220 and query 230 pair might be prone to select the first suggested answer 242 on the list, e.g., because the user might believe the suggested answers 242 are ranked by popularity and hence, the user might believe that the first suggested answer 242 is likely the correct answer.

In some implementations, the answer area 240 does not include suggested answers 242 or selection elements 244. For example, for the first user who views the media object 220 and query 230 pair, the system has not yet received any answers responsive to the media object 220 and query 230 pair. The answer area 240 can initially display only the text box 248 for receiving answers until at least one responsive answer has been provided by a contributing user. In some implementations, the answer area 240 does not include suggested answers 242 even after responsive answers have been received by the system. For example, to prevent any bias that might occur if suggested answers were displayed, the system can allow a viewing user to provide an answer only by submitting a new answer, e.g., through the text box 248, and not display any suggested answers 242 for selection.

The level of interest area 250 includes selection elements 252 (e.g., checkboxes or buttons). Each user viewing the media object 220 and query 230 pair can indicate the user's interest in the media object 220 and query 230 pair using the selection elements 252. In the example of FIG. 2, the user can indicate that the user finds the pair interesting, the user finds the pair not interesting, or the user does not have a comment. In some implementations, the level of interest indicated by the users (e.g., users of a community-based platform) is used in determining whether the media object 220 and query 230 pair is presented to additional users.

Figure 3:
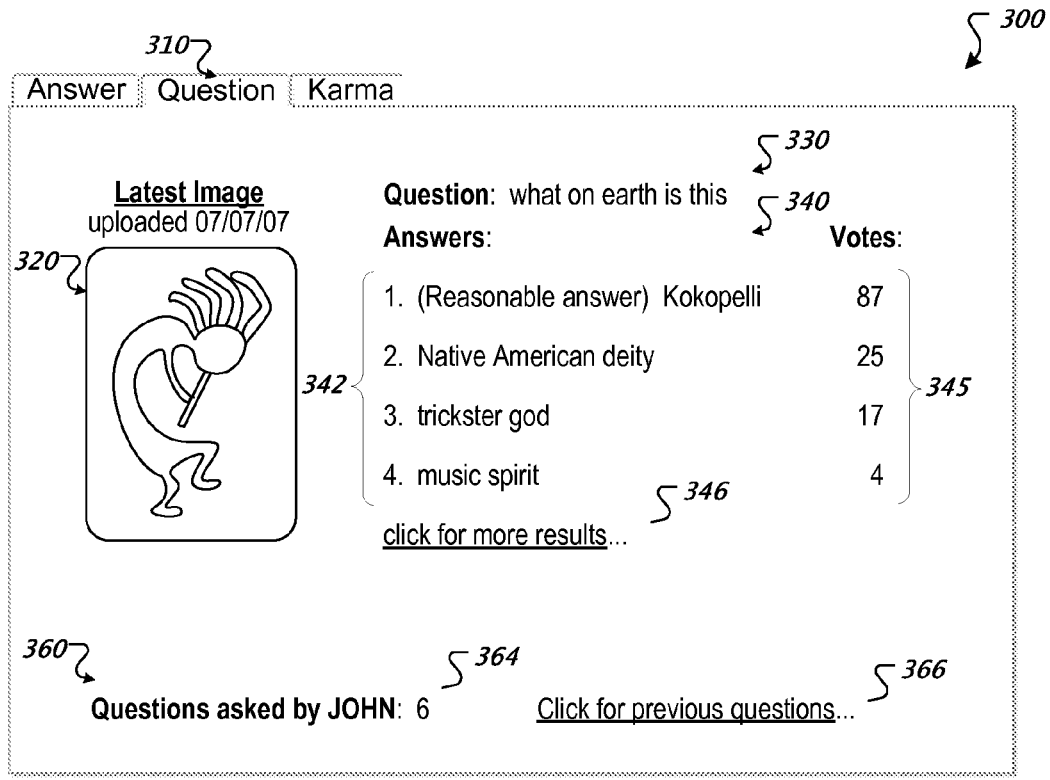
FIG. 3 illustrates an example interface for providing information to a user about media object and query pairs submitted by the user.

FIG. 3 illustrates an example interface 300 for providing information to a user about media object and query pairs submitted by the user. The example interface 300 is illustrated as a question tab 310 of a web interface, e.g., a web interface of a system that performs the example process 100 of FIG. 1. The example interface 300 is specific to a particular user (e.g., a member of a community-based platform with the user name "John"). In some implementations, the example interface 300 allows a user to upload a media object and formulate an associated text query (e.g., using a text box) relating to content in the media object. The uploaded media object and query pair is added to an archive of media object and query pairs submitted by the user.

The example interface 300 includes a media object 320, a query 330, an answer area 340, and a user question area 360. In some implementations, the example interface 300 includes information about the media object, e.g., a date the media object was uploaded to the system or the name of the user who submitted the media object. In the example of FIG. 3, a user has submitted the picture of Kokopelli with a query asking "what on earth is this."

The answer area 340 includes suggested answers 342, votes 345, and a hyperlink for more results 346. The suggested answers 342 are ranked according to the corresponding votes 345. The votes 345 for a particular suggested answer 342 indicate how many users agreed with the particular suggested answer 342. In some implementations, the system groups together similar suggested answers (e.g., answers which are permutations or synonyms of each other, as determined by related words tables) and combines the votes of the similar suggested answers before ranking. The user can view additional suggested answers by selecting the hyperlink for more results 346.

In some implementations, the system indicates which suggested answer 342 is likely the reasonable answer for the media object 320 and query 330 pair. For example, the system can select the suggested answer 342 with the highest rank (i.e., greatest number of votes 345) as the reasonable answer. Alternatively, the system can select the reasonable answer based, in part, on extrinsic information (e.g., information gathered by performing a search in an image or video repository).

The user question area 360 provides information to the user about other media object and query pairs submitted by the user. The user question area 360 includes the number of media object and query pairs 364 submitted by the user and stored by the system in an archive. The user can view the other media object and query pairs previously submitted by the user and the associated suggested answers by selecting a hyperlink for previous pairs 366.

Figure 4:
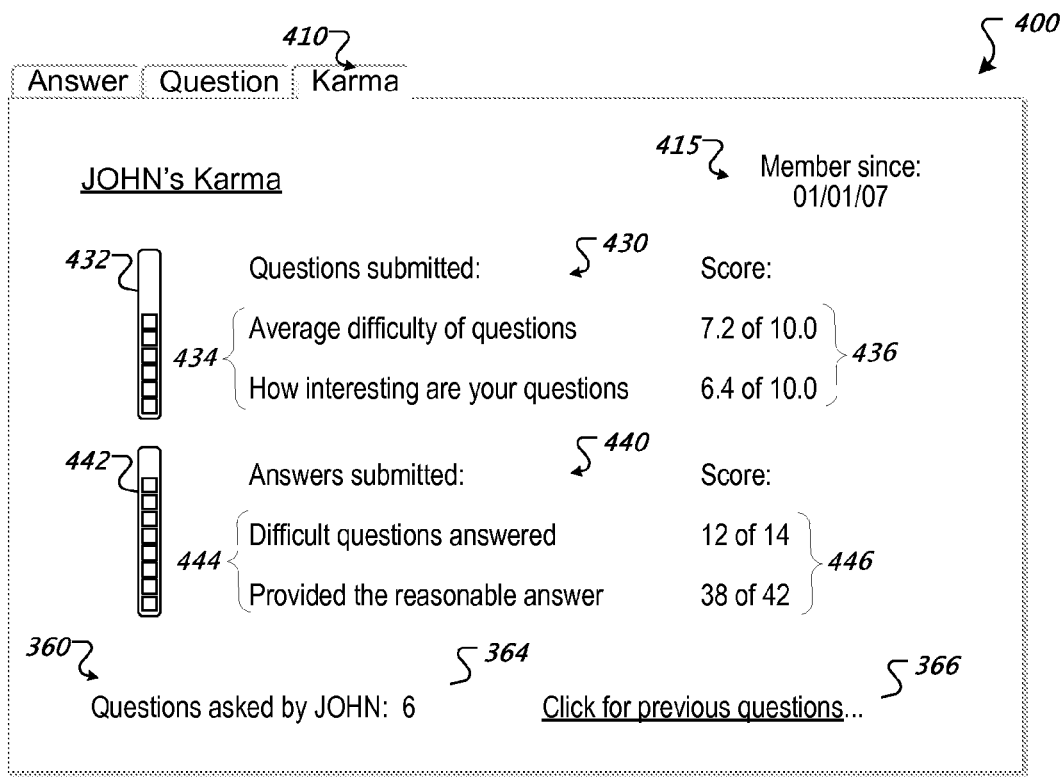
FIG. 4 illustrates an example interface for providing data to a user about media object and query pairs submitted by the user and suggested answers provided by the user.

FIG. 4 illustrates an example interface 400 for providing data to a user about media object and query pairs submitted by the user and suggested answers provided by the user. The example interface 400 is illustrated as a karma tab 410 of a web interface, e.g., a web interface of a system that performs the example process 100 of FIG. 1. The example interface 400 is specific to a particular user (e.g., a member of a community-based platform with the user name "John"). In some implementations, the example interface 400 is part of a user profile page for the particular user as a member of a community.

The example interface 400 includes a user information area 415, a question data area 430, an answer data area 440, and a user question area 360. The user information area 415 includes information about the user stored on the system, e.g., a date indicating how long the user has been a member of the community. Similar to FIG. 3, the user question area 360 provides information to the user about media object and query pairs previously submitted by the user.

The question data area 430 includes a question quality indicator element 432, question quality factors 434, and question quality scores 436. The question quality indicator element 432 indicates an overall quality level for the questions (i.e., media object and query pairs) submitted by the user, as measured by the question quality factors 434. Examples of question quality factors 434 include an average difficulty level of questions, an interest level of the questions, how many users where able to answer the questions, and how curious is the user. For each question quality factor 434, there is an associated question quality score 436. The question quality scores 436 can be computed based on user response to media object and query pairs submitted by the particular user. For example, an interest level of the questions can be computed by counting the user responses provided in the level of interest area 250 of FIG. 2.

The answer data area 440 includes an answer quality indicator element 442, answer quality factors 444, and answer quality scores 446. The answer quality indicator element 442 indicates an overall quality level for the answers submitted by the user, as measured by the answer quality factors 444. Examples of answer quality factors 444 include how many difficult questions were answered by the user and how many of the user's answers were the same as or similar to the reasonable answer. There is an answer quality score 446 associated with each answer quality factor 444. The answer quality scores 446 can be computed based on the particular user's responses to media object and query pairs presented to the particular user. In some implementations, an overall quality measure can be associated with each user. For example, a user who consistently submits high quality media object and query pairs and consistently provides high quality answers can receive a "guru" label, which can be displayed on the user's profile page or next to the user's uploaded media objects.

In some implementations, the karma tab 410 of the web interface includes a user interface element (not shown) that allows a user to view information about the users with the highest karma ratings (e.g., question quality scores 436 and answer quality scores 446). For example, selection by a user of a top karma hyperlink can trigger the system to present (e.g., in an overlay or in a separate interface) a list of the user names or user profiles of these highest scoring users.

Figure 5:
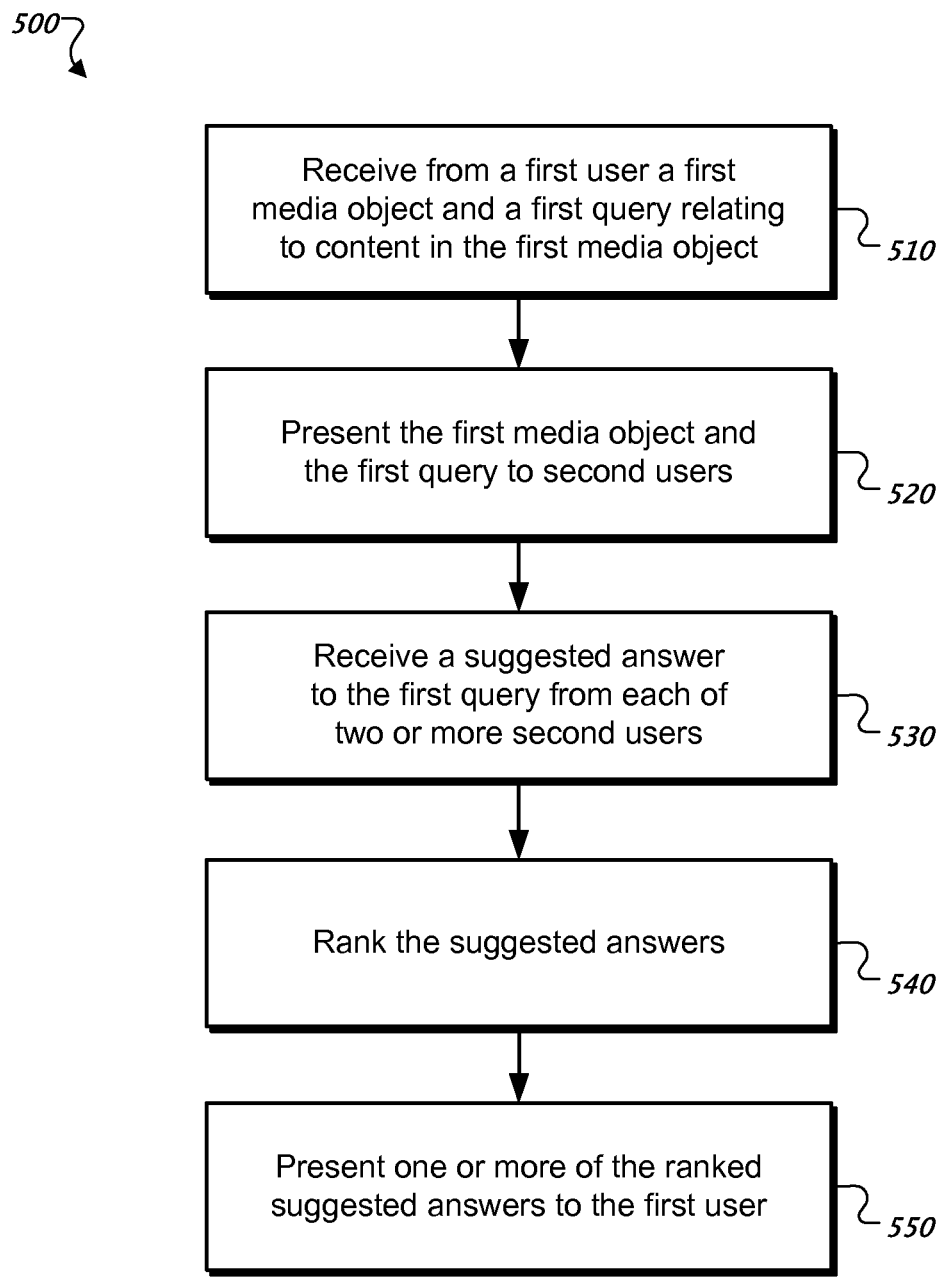
FIG. 5 shows an example process for receiving media object queries and presenting ranked suggested answers for the media object queries.

FIG. 5 shows an example process 500 for receiving media object queries and presenting ranked suggested answers for the media object queries. For convenience, the example process 500 will be described with reference to FIGS. 2-4 and a system (e.g., a community-based platform) that performs the process 500.

The system receives from a first user a first media object and a first query relating to content in the first media object (step 510). The first media object and query pair can be received, for example, in a web interface similar to the example interface 300 of FIG. 3. Examples of media objects include image files, video files, and audio files. The first media object can be generated by, for example, a device with a microphone or a camera. A device (e.g., a mobile phone) which has media data capturing capability and a network interface (e.g., for wired or wireless communication) can be used to both generate a media object with captured media data and submit the media object and query pair to the system.

The system presents (i.e., provides impressions of) the first media object and the first query to multiple second users (step 520). In some implementations, the second users are members of a subgroup (e.g., a friends group or a family group) associated with the first user, where the subgroup is part of a larger community, e.g., a social network. That is, the initial impressions of the first media object and query pair can be presented to users known to the first user.

In some implementations, the system includes the first media object and query pair in a list of second media object and query pairs, where the first media object and query pair has a position in the list. The system selects the first media object and query pair from the list for presentation to the multiple second users based on the position of the first media object and query pair in the list. In some implementations, the system selects the media object and query pair at the top of the list for presentation to a second user. In some implementations, a media object and query pair will not be presented more than once to the same second user. That is, if the media object and query pair at the top of the list has already been impressed upon a particular second user, the second user will be presented with the next media object and query pair on the list which has not been previously presented to the second user.

In one example, the list of media object and query pairs is part of an impression share mechanism. The media object and query pairs are ordered in the list according to each pair's impression score, where ordering is from highest to lowest impression score. Each new media object and query pair submitted to the system can initially receive a maximum impression score (e.g., 500), thereby positioning the new media object and query pair at the top of the list. During an initial impression period, the new media object and query pair receives a default number of impressions. For example, a new media object and query pair can be presented to second users a defined number of times (e.g., 100) by default in the initial impression period. After the initial impression period, the system can determine whether the particular media object and query pair will be presented to additional users based on the second users' responses, which modify the pair's impression score as described in more detail below.

The system receives a suggested answer to the first media object and the first query from each of two or more second users, where at least two of the suggested answers are distinct (step 530). A suggested answer from a particular second user can be a new suggested answer submitted by the particular second user in response to the first media object and query pair, or the suggested answer can be a suggested answer previously submitted by a different second user in response to the first media object and query pair. Alternatively, a suggested answer can be derived from previous suggested answers previously submitted by different second users in response to the first media object and query pair. For example, a derived suggested answer can be a previously submitted suggested answer with the spelling corrected. In some implementations, the suggested answers to the first media object and query pair are received over a specified time period. In other implementations, the suggested answers to the first media object and query pair are received over an unspecified time period. For example, the suggested answers can be received over the time period required to provide the default number of impressions of the first media object and query pair to second users.

The system ranks the suggested answers (step 540). In some implementations, the system groups similar suggested answers before ranking. The suggested answers can be grouped together, for example, based on identifying the semantic similarity between the suggested answers. In one example, the system subdivides a suggested answer into smaller units of words or phrases (e.g., n-grams of n numbers of words) and compares the units with units from another suggested answer, e.g., by searching for the units in related words tables. The comparison can generate a semantic similarity score between the two suggested answers. If the semantic similarity score is greater than a defined threshold score, the system can determine that the two suggested answers are sufficiently similar to be grouped together before ranking.

For each group of similar suggested answers, the system can determine a rank score for the group by counting the instances that a suggested answer in the group was provided (e.g., submitted or selected) by a second user. For each distinct suggested answer, the system can determine a rank score for the distinct suggested answer by counting the instances that the distinct suggested answer was provided by a second user. The system can rank the distinct suggested answers and groups of similar suggested answers based on the determined rank scores.

The system presents one or more of the ranked suggested answers to the first user (step 550). In some implementations, the system receives an indication of interest in the first media object and query pair from each of one or more second users presented with the pair. The indications of interest can be received, for example, in a web interface similar to the example interface 200 of FIG. 2. The system can modify the position of the first media object and query pair in the list of media object and query pairs based on the indications of interest in the first media object and query pair. In some implementations, the pair's position in the list is also modified based on the number of suggested answers provide (e.g., submitted or selected) by the second users. The system can select the first media object and query pair from the list for presentation as an impression to one or more third users based on the modified position of the first media object and query pair in the list.

In one example, the system modifies the position of the first media object and query pair in the list by updating the pair's impression score based on the second users' responses (e.g., the second users' level of interest in the pair and the number of answers provided by the second users). Table 1 illustrates example impression scoring weights for modifying a media object and query pair's impression score.

TABLE 1

Example impression scoring weights

| Response | Not Interesting | No Comment | Interesting |
|---|---|---|---|
| Answer | −5 | −1 | 1 |
| No Answer | −2 | 2 | 5 |

Table 1 divides user responses to a particular media object and query pair into six categories with an associated weight for each category. For each second user receiving an impression of the first media object and query pair, the system increments a counter for the respective response category. For example, if a second user indicates that the first media object and query pair is not interesting (e.g., using the respective selection element 252 of FIG. 2) but does not provide a suggested answer, the system increments a counter for the (No Answer, Not Interesting) category with an associated weight of −2.

At the end of the initial impression period in which the first media object and query pair had the maximum impression score (e.g., 500), the system weights the counter value for each category by the associated weight and sums the weighted values to determine an updated impression score for the pair. For example, if 8, 12, and 25 second users provided answers and indicated the pair was not interesting, provided no comment, and indicated the pair was interesting, respectively, and 15, 18, and 22 users did not provide answers and indicated the pair was not interesting, provided no comment, and indicated the pair was interesting, respectively, the updated impression score would be computed as (8*−5)+(12*−1)+(25*1)+(15*−2)+(18*2)+(22*5)=89. After the initial impression period, the position of the first media object and query pair in the list of pairs is modified based on the updated impression score.

If a particular media object and query pair has a high updated impression score (e.g., because most second users thought the pair was interesting but did not provide answers), the media object and query pair will remain high on the list but will be positioned below the new pairs with the maximum impression score. In contrast, if a particular media object and query pair has a low updated impression score (e.g., because most second users thought the pair was not interesting and provided answers), the media object and query pair will drop low on the list, and the likelihood that the system will select the pair for presentation to third users is greatly reduced.

In some implementations, the system removes a media object and query pair from the list if the updated impression score is below a determined threshold. In some implementations, following the initial impression period, the system updates the impression score of a media object and query pair on a scheduled basis (e.g., every additional 100 impressions or every week). In some implementations, the system removes a media object and query pair from the list after the media object and query pair has been on the list for a determined period of time. In other implementations, the system removes a media object and query pair from the list after the media object and query pair has had a maximum number of impressions or has received a maximum number of responses.

In some implementations, the system presents data to the first user relating to one or more media object and query pairs received from the first user or one or more suggested answers provided by the first user in response to media object and query pairs received from second users. For example, the system can provide to the first user (e.g., on a user profile page of a community-based platform) statistics about the quality of the media object and query pairs submitted by the user and statistics about the quality of the suggested answers provided by the user. These users statistics can be presented to the first user, for example, in a web interface similar to the example interface 400 of FIG. 4.

In some implementations, other users see some or all of the first user's statistics. In some implementations, other users see an overall quality measure (e.g., stars or labels) associated with the first user, for example, next to media object and query pairs submitted by the first user. Allowing users to view other users' overall quality measures or statistics provides a way to recognize and encourage high performing users of the system.

In some implementations, the system divides media object and query pairs into categories, e.g., people, places, and things. The system can maintain separate lists of media object and query pairs for each category. A user can specify a particular category for submitting a media object and query pair and can request to receive impressions of media object and query pairs from a particular category. In some implementations, the system automatically determines how a submitted media object and query pair should be categorized (e.g., using image processing algorithms).

In some implementations, the system recognizes submitted images or video as pornography, e.g., by scanning the image or video for skin color. The system can then reject the media object or can automatically categorize the media object as adult material. In some implementations, the system can operate in a safe search mode, which blocks adult material and other mature content from being presented to a user.

In some implementations, the system includes a translation service. For example, the system can accommodate a language preference associated with a user by presenting queries and suggested answers translated to the user's preferred language, e.g., using statistical machine translation or a translation dictionary. A language preference can be associated with a user when, for example, the user specifies the language preference or the system infers a language preference, e.g., from the language used by the user or the domain accessed.

Figure 6:
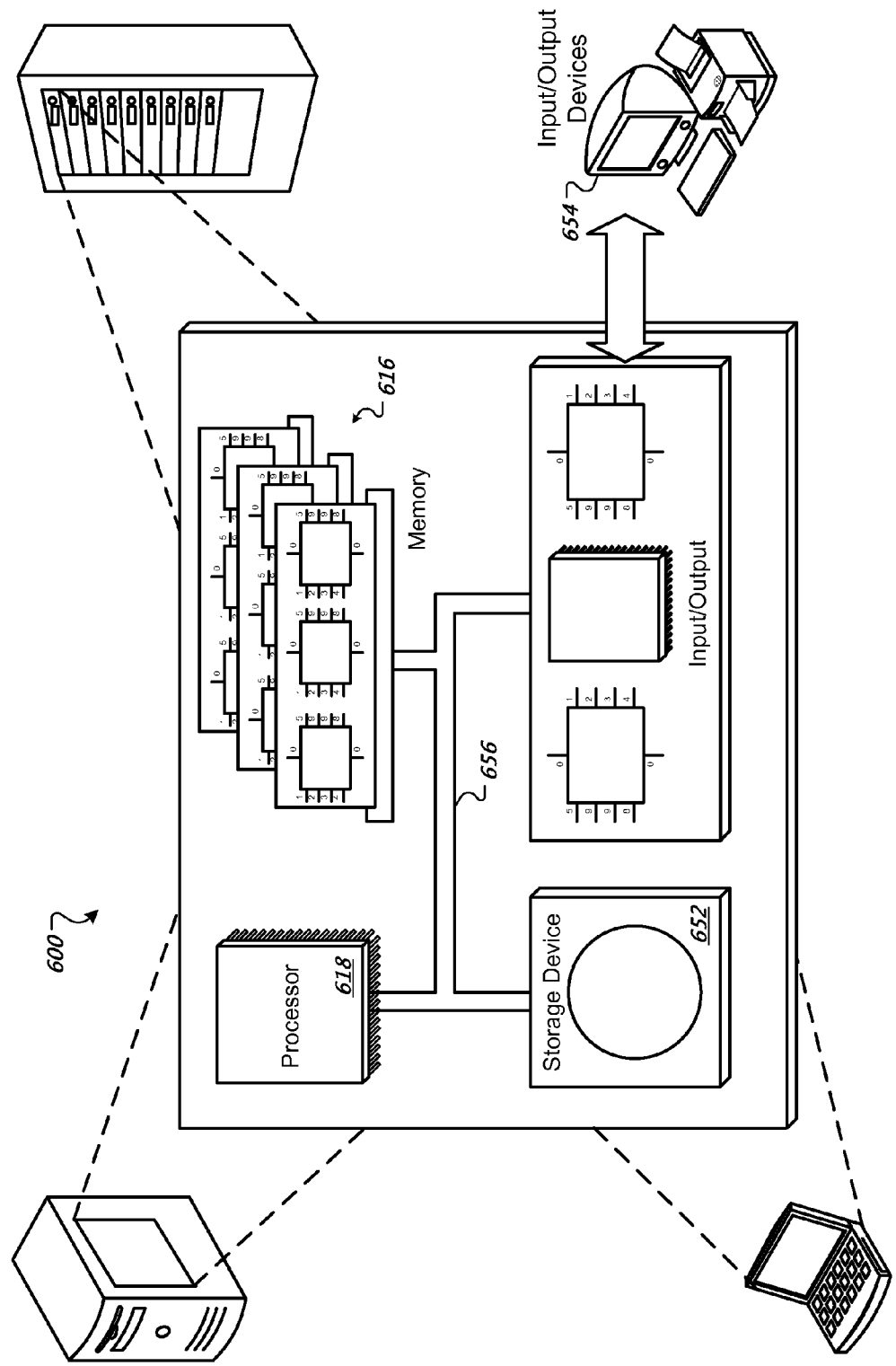
FIG. 6 is a schematic diagram of an example computer system.

FIG. 6 is a schematic diagram of an example computer system 600. The system 600 can be used for performing the actions and methods described above. The system 600 can include a processor 618, a memory 616, a storage device 652, and input/output devices 654. Each of the components 618, 616, 652, and 654 are interconnected using a system bus 656. The processor 618 is capable of processing instructions within the system 600. These instructions can implement one or more aspects of the systems, components, and techniques described above. In some implementations, the processor 618 is a single-threaded processor. In other implementations, the processor 618 is a multi-threaded processor. The processor 618 can include multiple processing cores and is capable of processing instructions stored in the memory 616 or on the storage device 652 to display graphical information for a user interface on the input/output device 654.

The memory 616 is a computer readable medium such as volatile or non-volatile that stores information within the system 600. The memory 616 can store processes related to the functionality of the search engine 1030, for example. The storage device 652 is capable of providing persistent storage for the system 600. The storage device 652 can include a floppy disk device, a hard disk device, an optical disk device, or a tape device, or other suitable persistent storage mediums. The storage device 652 can store the various databases described above. The input/output device 654 provides input/output operations for the system 600. The input/output device 654 can include a keyboard, a pointing device, and a display unit for displaying graphical user interfaces.

The computer system shown in FIG. 6 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, from a user device of a first user, an image and a text query related to the image, wherein the text query requests information identifying content presented in the image;
    providing for presentation the image and the text query to a plurality of second users different from the first user; and
    receiving a suggested answer to the text query from each of a group of second users of the plurality of second users, and wherein a suggested answer from a particular second user is either a new suggested answer submitted by the particular second user in response to the text query or a previous suggested answer to the text query, the previous suggested answer being a suggested answer previously submitted by a different second user of the plurality of second users in response to the text query.

2. The method of claim 1, further comprising:
    providing one or more of the suggested answer for presentation to the first user.

3. The method of claim 2, wherein providing one or more of the suggested answers includes providing one or more ranked suggested answers and wherein providing one or more ranked suggested answers comprises:
    grouping similar suggested answers based on a semantic similarity measure; and
    ranking the suggested answers where each group of similar suggested answers is given a combined ranking.

4. The method of claim 3, wherein ranking the suggested answers further comprises:
    for each group of similar suggested answers, determining a rank score for the group by counting the instances that a suggested answer in the group was submitted or selected by a second user;
    for each distinct suggested answer, determining a rank score for the distinct suggested answer by counting the instances that the distinct suggested answer was submitted or selected by a second user; and
    ranking the distinct suggested answers and groups of similar suggested answers based on the determined rank scores.

5. The method of claim 1, wherein providing the image and the text query to the plurality of second users further comprises:
    including the image and the text query pair in a list of additional image and query pairs, the image and text query pair having a position in the list; and
    selecting the image and text query pair from the list for presentation to the plurality of second users, the selection based on the position of the image and text query pair in the list.

6. The method of claim 5, further comprising:
    modifying a position of the image and text query pair in the list based on indications of interest in the image and text query pair from one or more second users of the plurality of second users; and
    selecting the image and text query pair from the list for presentation to one or more third users, the selection based on the modified position of the image and text query pair in the list.

7. The method of claim 5, further comprising:
    determining an impression score for the image and text query pair based on an indication of interest received from each second user; and modifying a position of the image and the text query pair in the list provided to a plurality of third users based on the impression score.

8. The method of claim 1, comprising:
providing data to the first user for presentation, the data relating to one or more image and text query pairs received from the first user or one or more suggested answers submitted or selected by the first user in response to image and text query pairs received from one or more second users.

9. A system comprising:
one or more computers and one or more storage devices storing instructions that are operable, when executed by the one or more computers, to cause the one or more computers to perform operations comprising:
receiving, from a user device of a first user, an image and a text query related to the image, wherein the text query requests information identifying content presented in the image;
providing for presentation the image and the text query to a plurality of second users different from the first user; and
receiving a suggested answer to the text query from each of a group of second users of the plurality of second users, and wherein a suggested answer from a particular second user is either a new suggested answer submitted by the particular second user in response to the text query or a previous suggested answer to the text query, the previous suggested answer being a suggested answer previously submitted by a different second user of the plurality of second users in response to the text query.

10. The system of claim 9, wherein the operations further comprise:
providing one or more of the suggested answer for presentation to the first user.

11. The system of claim 10, wherein providing one or more of the suggested answers includes providing one or more ranked suggested answers and wherein providing one or more ranked suggested answers comprises:
grouping similar suggested answers based on a semantic similarity measure; and
ranking the suggested answers where each group of similar suggested answers is given a combined ranking.

12. The system of claim 11, wherein ranking the suggested answers further comprises:
for each group of similar suggested answers, determining a rank score for the group by counting the instances that a suggested answer in the group was submitted or selected by a second user;
for each distinct suggested answer, determining a rank score for the distinct suggested answer by counting the instances that the distinct suggested answer was submitted or selected by a second user; and
ranking the distinct suggested answers and groups of similar suggested answers based on the determined rank scores.

13. The system of claim 9, wherein providing the image and the text query to the plurality of second users further comprises:
including the image and the text query pair in a list of additional image and query pairs, the image and text query pair having a position in the list; and
selecting the image and text query pair from the list for presentation to the plurality of second users, the selection based on the position of the image and text query pair in the list.

14. The system of claim 13, wherein the operations further comprise:
modifying a position of the image and text query pair in the list based on indications of interest in the image and text query pair from one or more second users of the plurality of second users; and
selecting the image and text query pair from the list for presentation to one or more third users, the selection based on the modified position of the image and text query pair in the list.

15. The system of claim 13, wherein the operations further comprise:
determining an impression score for the image and text query pair based on an indication of interest received from each second user; and
modifying a position of the image and text pair in the list provided to a plurality of third users based on the impression score.

16. The system of claim 9, wherein the operations comprise:
providing data to the first user for presentation, the data relating to one or more image and text query pairs received from the first user or one or more suggested answers submitted or selected by the first user in response to image and text query pairs received from one or more second users.

17. A non-transitory computer storage medium encoded with a computer program, the program comprising instructions that when executed by one or more computers cause the one or more computers to perform operations comprising:
receiving, from a user device of a first user, an image and a text query related to the image, wherein the text query requests information identifying content presented in the image;
providing for presentation the image and the text query to a plurality of second users different from the first user; and
receiving a suggested answer to the text query from each of a group of second users of the plurality of second users, and wherein a suggested answer from a particular second user is either a new suggested answer submitted by the particular second user in response to the text query or a previous suggested answer to the text query, the previous suggested answer being a suggested answer previously submitted by a different second user of the plurality of second users in response to the text query.

18. The computer storage medium of claim 17, further comprising instructions that when executed by one or more computers cause the one or more computers to perform operations comprising:
providing one or more of the suggested answer for presentation to the first user.

19. The computer storage medium of claim 18, wherein providing one or more of the suggested answers includes providing one or more ranked suggested answers and wherein providing one or more ranked suggested answers comprises:
grouping similar suggested answers based on a semantic similarity measure; and
ranking the suggested answers where each group of similar suggested answers is given a combined ranking.

20. The computer storage medium of claim 17, wherein providing the image and the text query to the plurality of second users further comprises:
including the image and the text query pair in a list of additional image and query pairs, the image and text query pair having a position in the list; and selecting the image and text query pair from the list for presentation to the plurality of second users, the selection based on the position of the image and text query pair in the list.

* * * * *